(12) United States Patent
Liu (10) Patent No.: US 12,511,092 B2
(45) Date of Patent: Dec. 30, 2025

(54) DISPLAY SYSTEM, TERMINAL DEVICE AND TERMINAL DEVICE CONTROL METHOD

(71) Applicant: SILICON MOTION INC., Hsinchu County (TW)

(72) Inventor: Wenwen Liu, Hsinchu County (TW)

(73) Assignee: SILICON MOTION INC., Hsinchu County (TW)

( * ) Notice: Subject to any disclaimer, the term of this patent is extended or adjusted under 35 U.S.C. 154(b) by 0 days.

(21) Appl. No.: 18/523,920

(22) Filed: Nov. 30, 2023

(65) Prior Publication Data
US 2024/0411503 A1   Dec. 12, 2024

(30) Foreign Application Priority Data
Jun. 12, 2023 (CN) .......................... 202310688617.6

(51) Int. Cl.
G06F 3/14 (2006.01)
G06F 3/01 (2006.01)

(52) U.S. Cl.
CPC ............ *G06F 3/1454* (2013.01); *G06F 3/011* (2013.01)

(58) Field of Classification Search
None
See application file for complete search history.

(56) References Cited

U.S. PATENT DOCUMENTS

| 2014/0359493 | A1* | 12/2014 | Hong ............... G06F 3/1454 715/761 |
| 2018/0321757 | A1 | 11/2018 | Jo et al. |
| 2020/0183525 | A1* | 6/2020 | Liu ............... G06F 3/0416 |

FOREIGN PATENT DOCUMENTS

| CN | 105264903 A | 1/2016 |
| CN | 107577385 A | 1/2018 |
| TW | I616808 B | 3/2018 |
| TW | I706645 B | 10/2020 |
| TW | 202227999 A | 7/2022 |

* cited by examiner

*Primary Examiner* — Joseph R Haley
(74) *Attorney, Agent, or Firm* — CKC & Partners Co., LLC (57) ABSTRACT

A terminal device control method, comprising: performing, by a processor of a terminal device, a stream function to capture at least one part of a display screen of the terminal device, wherein the at least one part of the display screen is transmitted to an external display; when receiving a wake-up signal, the processor turning on a display panel of the terminal device to display the display screen; stopping, by the processor, performing the stream function during a disable period, so that the processor stops capturing the at least one part of the display screen; and after the disable period, resuming to perform the stream function to resume transmitting the at least one part of the display screen to the external display.

17 Claims, 5 Drawing Sheets

DISPLAY SYSTEM, TERMINAL DEVICE AND TERMINAL DEVICE CONTROL METHOD

CROSS-REFERENCE TO RELATED APPLICATION

This application claims priority to China Application Serial Number 202310688617.6, filed Jun. 12, 2023, which is herein incorporated by reference in its entirety.

BACKGROUND

Technical Field

The present disclosure relates to a control technology of screen of display device, especially a display system, terminal device and terminal device control method.

Description of Related Art

With the development of computer and network communication technology, various terminal devices have become an indispensable tool in people's life. Taking laptops or smart phones as examples, "remote control" and "cloud collaboration" are one of the application technologies that has been highly valued in recent years. These application technologies can improve work efficiency, allowing users to share or control the same screen at different locations using different terminal devices. However, the operation fluency of these application technologies will directly affect the user experience, and there are still many things that can be optimized and improved in the current technologies.

SUMMARY

One aspect of the present disclosure is a terminal device control method, comprising: performing, by a processor of a terminal device, a stream function to capture at least one part of a display screen of the terminal device, wherein the at least one part of the display screen is transmitted to an external display; when receiving a wake-up signal, turning on a display panel of the terminal device to display the display screen by the processor; stopping, by the processor, performing the stream function during a disable period, so that the processor stops capturing the at least one part of the display screen; and after the disable period, resuming to perform the stream function to resume transmitting the at least one part of the display screen to the external display.

Another aspect of the present disclosure is a terminal device, comprising a communication circuit, a display panel and a processor. The communication circuit is communicatively connected to an external display. The processor is coupled to the communication circuit and the display panel, and is configured to perform a stream function to capture at least one part of a display screen of the terminal device. The at least one part of the display screen is transmitted to the external display. When the processor receives a wake-up signal, the processor turns on the display panel to display the display screen, and stops performing the stream function during a disable period, so that the processor stops capturing the at least one part of the display screen. After the disable period, the processor resumes to perform the stream function to resume transmitting the at least one part of the display screen to the external display.

Another aspect of the present disclosure is a display system, comprising a display panel and a terminal device. The terminal device is communicatively connected to the display panel and an external display to display a display screen by the display panel and/or the external display. When the terminal device performs a stream function, the terminal device is configured to capture at least one part of a display screen of the terminal device, and the at least one part of the display screen is transmitted to the external display. When the terminal device receives a wake-up signal, the terminal device drives the display panel to display the display screen, and stops performing the stream function during a disable period, so that the terminal device stops capturing the display screen. After the disable period, the terminal device resumes to perform the stream function to resume transmitting the at least one part of the display screen to the external display.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1A:
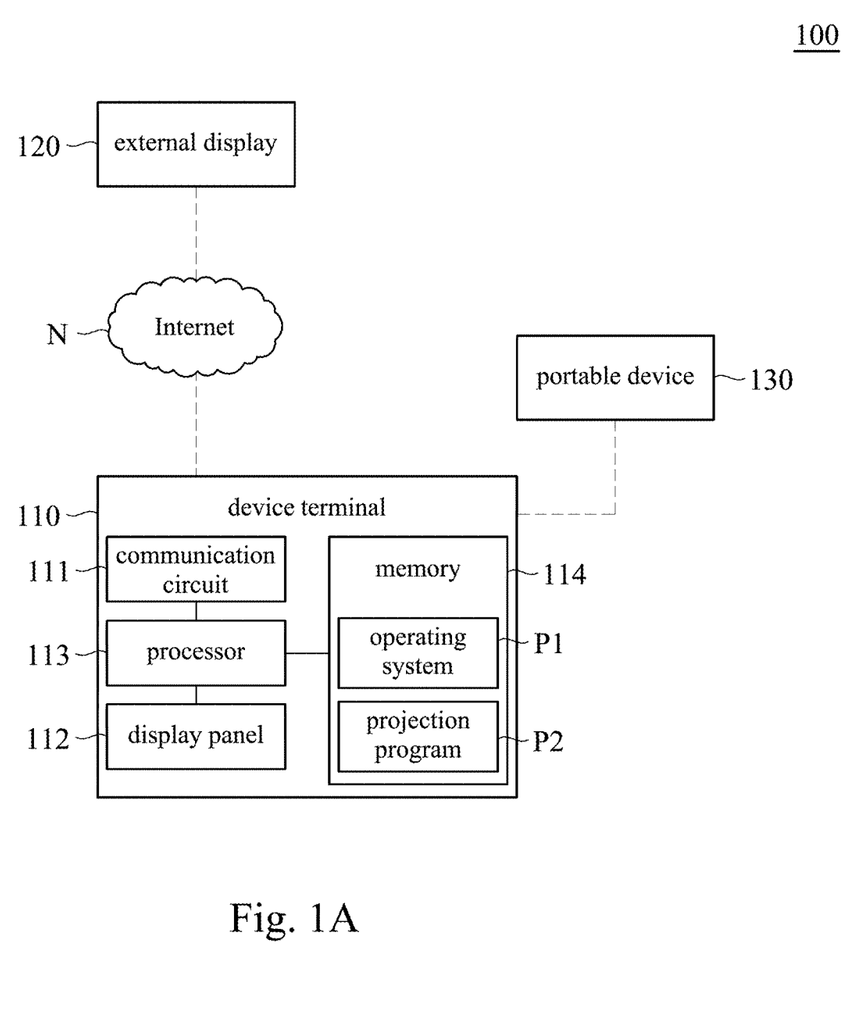
FIG. 1A is a schematic diagram of a terminal device and a display system in some embodiments of the present disclosure.

FIG. 1A is a schematic diagram of a display system 100 in some embodiments of the present disclosure. The display system 100 includes a terminal device 110, an external display 120 and a portable device 130. The terminal device 110 includes a communication circuit 111, a display panel 112, a processor 113 and a memory 114. The communication circuit 111 is configured to communicate with the external display 120 by wireless transmission technology (e.g., WiFi, AirPlay, Miracast), so that data transmission can be performed between the terminal device 110 and the external display 120. The processor 113 is coupled to the communication circuit 111, the display panel 112 and the memory 114, and is configured to control the display panel 112 to provide a display screen.

In one embodiment, the processor 113 is configured to transmit at least one part of the display screen of the terminal device 110 to the external display 120 through the communication circuit 111, so that the external display 120 displays a virtual screen. In other words, after the terminal device 110 establishes the virtual screen on the external display 120, images presented by the display panel 112 of the terminal device 110 and the external display 120 will be synchronized with each other (i.e., screen projection), or will be an extension of each other (i.e., screen expansion). Since there are many ways to establish the virtual screen, and those skilled in the art can understand generation of the virtual screen, so it will not repeat them here.

An operating system P1 of the terminal device 110 is installed in the memory 114, and a projection program P2 is also installed in the memory 114. In one embodiment, when the processor 113 performs the projection program P2, the processor 113 calls a stream function in the operating system P1 to capture at least one part of the display screen of the display panel 112 as a streaming signal, but the present disclosure is not limited to calling the stream function. In some embodiments, the streaming signal also includes an audio signals generated by the terminal device 110 along with the display screen. The external display 120 can generate and establish the virtual screen according to the streaming signal. In one embodiment, the stream function may be one of the Application Programming Interface (API) functions of the operating system P1.

In one embodiment, the terminal device 110 can be communicatively connected to a portable device 130 through wireless transmission technology, and then determine a distance D between the terminal device 110 and the portable device 130 (e.g., based on strength of the wireless signal). In another embodiment, the terminal device 110 and the portable device 130 are respectively provided with corresponding distance sensors (e.g., optical distance sensors or acoustic wave distance sensors), so that the terminal device 110 determines the distance D between the terminal device 110 and the portable device 130. Since those skilled in the art can understand the method of determining the distance D between the terminal device 110 and the portable device 130, it will not be repeated here.

In some embodiments, the portable device 130 can be a wearable device, and is provided with a wearable sensor. For example, when the user wears the portable device 130 (e.g., worn on the wrist), the wearable sensor of the portable device 130 can determine that the portable device 130 is in a "wearing state" when detecting a touch signal (e.g., a voltage or current signal generated by detecting changes in the capacitance) or a physiological signal (e.g., pulse, body temperature) of the user.

Figure 1B:
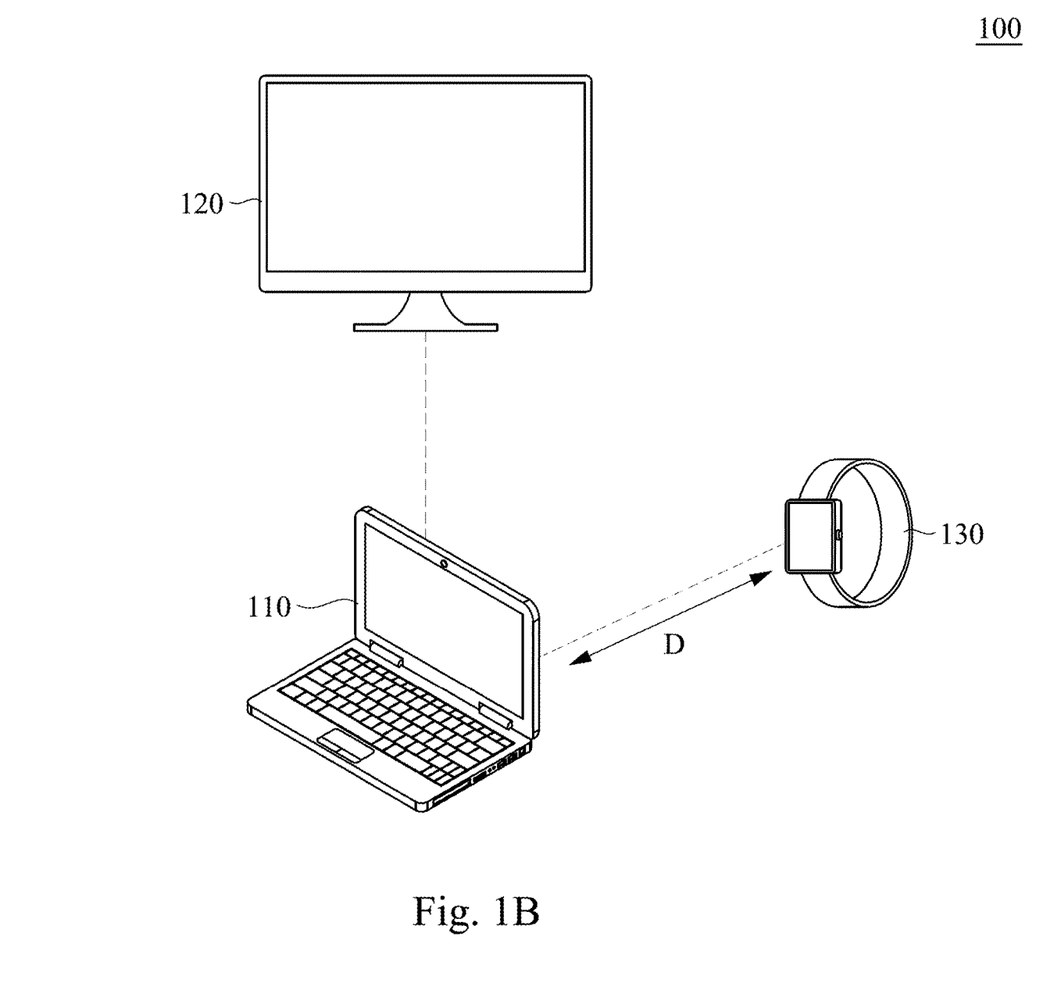
FIG. 1B is a schematic diagram of a terminal device and a display system in some embodiments of the present disclosure.

In the application of some embodiments, as shown in FIG. 1B, the terminal device 110 can be a laptop of the user, the portable device 130 can be a device worn on the user (e.g., smart watch), and the external display 120 can be a television panel or a projection device. The terminal device 110 is configured to transmit at least one part of the display screen to the external display 120 in the form of a streaming signal (referred to as "screen share state"). In addition, when the user does not perform any operations on the terminal device 110 for a period of time (e.g., 1 minute), the terminal device 110 will turn off the display panel 112 to save power (referred to as "screen lock state"). When the terminal device 110 is in the screen lock state, the user is usually in a state of temporarily leaving the terminal device (e.g., temporarily leaving the seat).

In one embodiment, since the terminal device 110 and the portable device 130 are owned by the same user (e.g., the terminal device 110 and the portable device 130 are both logged into the same user account), the portable device 130 can be used to release the screen lock state of the terminal device 110. However, if the terminal device 110 is in the screen share state at this time, in order to prevent the user's personal information from being accidentally disclosed to others, the operating system P1 of the terminal device 110 may prohibit the screen lock state of the terminal device 110 from being released by the portable device 130.

Figure 2:
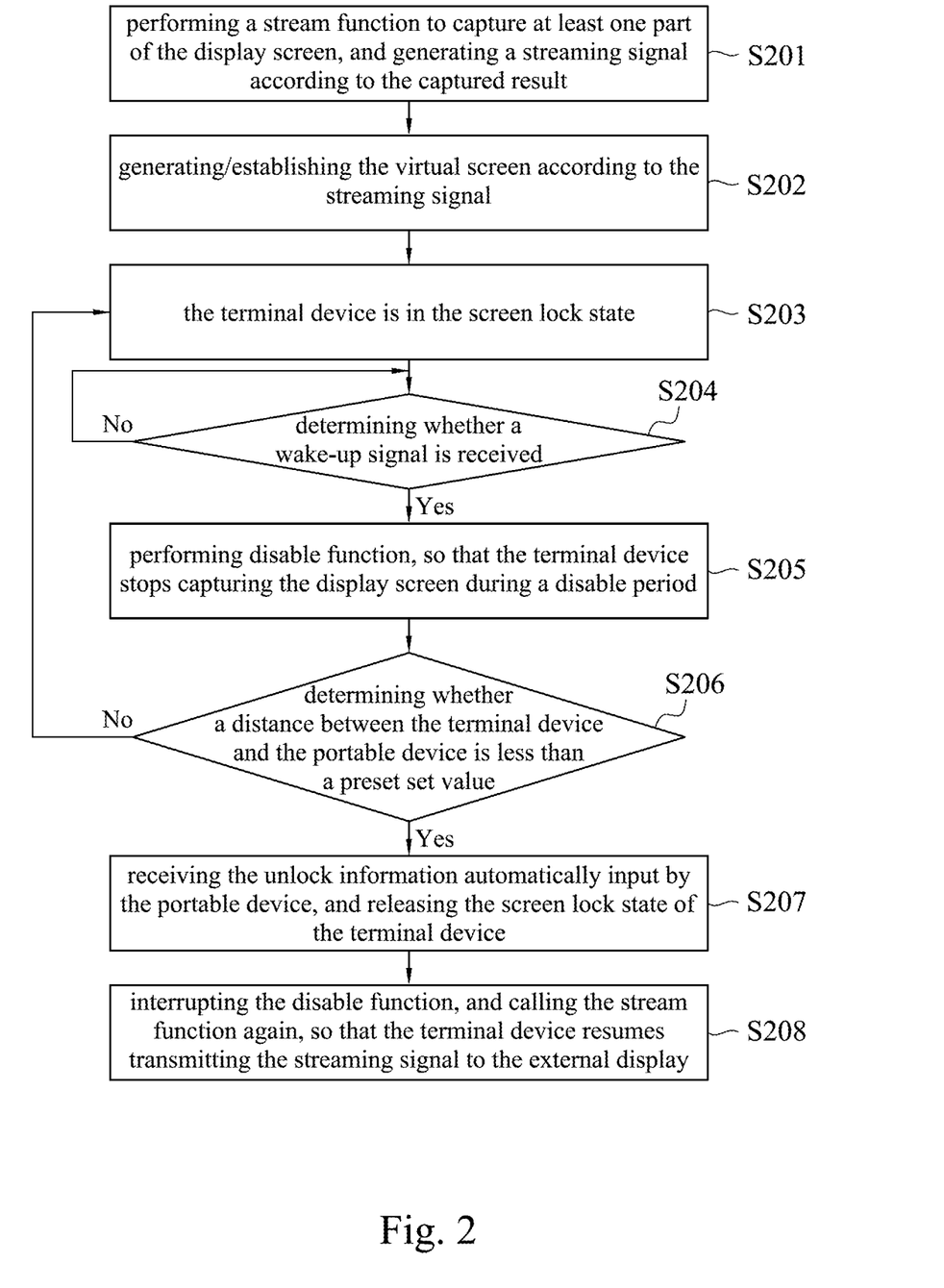
FIG. 2 is a flowchart illustrating a terminal device control method in some embodiments of the present disclosure.

The present disclosure can be used to solve a system limitation of "when the terminal device 110 is in the screen share state and the screen lock state at the same time, the operating system P1 does not allow the portable device 130 to be used to release the screen lock state." FIG. 2 is a flowchart illustrating a terminal device control method in some embodiments of the present disclosure. In step S201, a processor 113 of the terminal device 110 performs a stream function to capture at least one part of the display screen of the terminal device 110, and generates a streaming signal according to the captured result. The terminal device 110 transmits the streaming signal to the external display 120. In one embodiment, the streaming signal also includes an audio signal generated by the terminal device 110 along with the display screen.

"The stream function" can be a program or command set/installed in the terminal device 110. For example, the operating command or API function in the operating system P1 of the terminal device 110, and can be called by other program. Taking MAC operating system as an example, the stream function can be the system's API function "CGDisplayStreamCreateWithDispatchQueue", and is configured to capture the display screen. When the projection program P2 is performed, and the projection program P2 calls the stream function, the operating system P1 of the terminal device 110 can determine that there is a program (i.e., the projection program P2) preparing to perform the action of "capturing the display screen".

In one embodiment, when the projection program P2 performs the stream function for the first time, the operating system P1 controls the terminal device 110 to display a "permission notification" to notify the user that the projection program P2 prepares to capture the display screen, and informs the user that the projection program P2 will be given permission to capture the display screen (i.e., perform the stream function). In some embodiments, when the user operates the terminal device 110 to allow the projection program P2 to capture the display screen (i.e. perform the stream function), the operating system P1 will also register a "listening event" to monitor the power management state of the terminal device 110, and instantly confirm whether the terminal device 110 is in the screen lock state.

In step S202, the external display 120 receives the streaming signal, and generates/establishes the virtual screen according to the streaming signal. The virtual screen will be the same as the display screen of the display panel 112 of the terminal device 110, or be used as an extended screen of the display screen.

In step S203, when the terminal device 110 is not operated (e.g., does not receive any input signals from input devices such as keyboard, mouse, and trackpad) for a period of time (e.g., within five minutes), the processor 113 will turn off the display panel 112, so that the terminal device 110 is in the screen lock state. In one embodiment, the terminal device 110 does not turn off the projection program P2 and the stream function at this time, the timing signal of the terminal device 110 for the display screen will be temporarily turned off, making the operating system P1 in a sleep state. In this situation, the terminal device 110 will interrupt transmitting the streaming signal to the external display 120, and the external display 120 will be turned off accordingly.

In step S204, the processor 113 of the terminal device 110 determines whether a wake-up signal is received. "Wake-up signal" is configured to control the processor 113 to drive/turn on the display panel 112 to display the display screen. In one embodiment, "wake-up signal" can be any input signal generated by the input device of the terminal device 110. For example, any key on the keyboard is clicked, the mouse is moved, or the trackpad detects a touch event. However, the present disclosure is not limited to this, and "wake-up signal" can be generated by any suitable method. For example, in other embodiments, "wake-up signal" can also be automatically generated by the terminal device 110 when the terminal device 110 detects that the angle between the display panel 112 and the keyboard exceeds a preset angle (e.g., 90 degrees). If the result of step S204 is "yes", performing step S205. If the result of step S204 is "no", step S204 will be performe again.

In step S205, when the processor 113 of the terminal device 110 receives the wake-up signal, the processor 113 controls the display panel 112 to turn on, and displays a display screen (hereinafter referred to as "unlock screen") to "notify the user to enter an unlock information". When the processor displays the unlock screen, the user can manually enter the unlock information to release the screen lock state (in this situation, the unlock information can be password entered by the user in the field of the unlock screen, or fingerprint entered by the user by a fingerprint sensor of the terminal device). In addition, when the processor 113 displays the unlock screen, the portable device 130 can automatically input the unlock information in the subsequent step S206 (in this situation, the unlock information can be password that the portable device 130 automatically enters in the field of the unlock screen).

It is worth mentioning that, in step S205, the processor 113 will also perform/call a disable function, so that the terminal device 110 stops calling the stream function (i.e., stop capturing the display screen) and generating the streaming signal during a disable period (e.g., 1 second). At this time, since the external display 120 does not receive the streaming signal, the external display 120 will not be turned on (e.g., the unlock screen will not be displayed), and will maintain in a turned-off state.

In step S206, during the disable period (e.g., the period during which the disable function is called), the processor 113 determines whether a distance D between the terminal device 110 and the portable device 130 is less than a preset set value (e.g., one meter). If the result of step S206 is "yes" (e.g., the distance D between the terminal device 110 and the portable device 130 is less than the set value), the processor 113 performs step S207 to receive the unlock information automatically input by the portable device 130, and release the screen lock state of the terminal device 110 according to the automatically input unlock information. If the result of step S206 is "no", the processor 113 receives the request and performs step S203 again.

In step S208, when the screen lock state of the terminal device 110 is released, the processor 113 of the terminal device 110 interrupts the disable function, and calls the stream function again, so that the terminal device 110 resumes transmitting the streaming signal to the external display 120. In some embodiments, when the processor 113 calls the stream function again, the processor 113 is also configured to perform one of multiple callback functions in the stream function, and is also configured to generate "update area data" and "description data", so that the processor 113 can generate the streaming signal based on the update area data and the description data. The update area data is configured to record an area or a position where the virtual screen needs to be updated (e.g., the update area data record "only the central area changes and must be updated, and other areas have not changed and do not need to be updated"). The description data is configured to record an update data of the area or the position in the display screen. For example, updated luminance value of each pixel to be updated in the area or position.

In some embodiments, the disable function can be an API function "CGDisplayStreamStop" of the operating system P1, and is configured to temporarily stop capturing the display screen and generating the streaming signal, or temporarily interrupt/disable the stream function. When the processor 113 calls the disable function, the streaming signal temporarily stops being generated, but the processor 113 does not close/end the projection program P2. Therefore, in step S208, the processor 113 does not need to restart the projection program P2, avoiding the problem that the display panel 112 may flicker due to restarting the projection program P2.

In addition, in step S208, the processor 113 can turn on the external display 120 after resuming transmitting the streaming signal to the external display 120. Therefore, the operation of "the processor 113 temporarily stopping generating the streaming signal" will not change the display of the external display 120. In short, in steps S205-S208, neither the display panel 112 nor the external display 120 will flicker, and the user will not notice that the processor 113 performs/calls the disable function, so the terminal device control method in FIG. 2 can improve user experience.

In some embodiments, the terminal device 110 and the portable device 130 need to log in to the same user account, and a wireless connection needs to be established between each other, or each has the ability to connect to the Internet N. Accordingly, the terminal device 110 can use the portable device 130 to confirm the identity of the user through the wireless connection or the Internet N. For example, the terminal device 110 can communicatively connect to a server to determine whether an account currently logged in by the terminal device 110 on the server matches an account logged in by the portable device 130 on the server. When the terminal device 110 determines that the login account matches in step S207, the terminal device 110 receives the unlock information automatically input by the portable device 130, and automatically releases the screen lock state.

In some embodiments, the terminal device 110 can also determine whether the portable device 130 is in the wearing state. As mentioned above, the portable device 130 can determine whether the portable device 130 is worn on the user (i.e., whether the portable device 130 is in the wearing state) based on whether a touch signal and/or a physiological signal is detected. For example, when the portable device 130 detects the touch signal and/or the physiological signal, the portable device 130 determines that it is in the wearing state, otherwise, it is not in the wearing state. The portable device 130 can upload a confirmation result of the wearing state to the server. The terminal device 110 is connected to the server to confirm whether the portable device 130 is in the wearing state. When the terminal device 110 confirms in step S207 that the portable device 130 is in the wearing state, the terminal device 110 receives the unlock information automatically input by the portable device 130, and automatically releases the current screen lock state.

In summary, during the disable period, when the processor 113 of the terminal device 110 determines that one or more of the following preset conditions occur, the processor 113 receives the unlock information automatically input by the portable device 130 in step S207 to automatically release the screen lock state. The preset conditions include but are not limited to: (1) the distance D between the terminal device 110 and the portable device 130 is less than the set value; (2) the terminal device 110 and the portable device 130 log in to the same account, (3) the terminal device 110 determines that the portable device 130 is in the wearing state.

"Releasing the screen lock state" mentioned in the foregoing embodiment refers to that the processor 113 controls the display panel 112 to remove the unlock screen, and displays a working screen of the terminal device 110 before entering the screen lock state (e.g., the desktop of the operating system P1). It is worth mentioning that, the method of "releasing the screen lock state" is not limited to the aforementioned method. During the disable period, when the terminal device 110 determines that one or more of the above preset conditions are matched, the terminal device 110 does not need to receive the unlock information automatically input by the portable device 130 in step S207, but can directly release the screen lock state.

In addition, in one embodiment, steps S206-S207 can be an unlocking mechanism that operates independently, and does not need to be activated until after step S205. In other words, even if the processor 113 has not performed the disable function, the processor 113 can still determine whether the distance between the terminal device 110 and the portable device 130 is less than the set value according to the unlocking mechanism of the operating system P1. At this time, the processor 113 is still performing the stream function. Therefore, even if the processor 113 confirms that the portable device 130 is close to the terminal device 110, the protection mechanism of the operating system P1 will still automatically prohibit using the portable device 130 to unlock the terminal device 110.

The terminal device control method of the present disclosure temporarily stops capturing the display screen, and uses a gap of the disable period to allow the unlocking mechanism to operate normally. Accordingly, the system limitation of "when the terminal device 110 is in the screen share state and the screen lock state at the same time, the portable device 130 cannot be used to unlock the display screen" in the operating system P1 will be solved.

Figure 3:
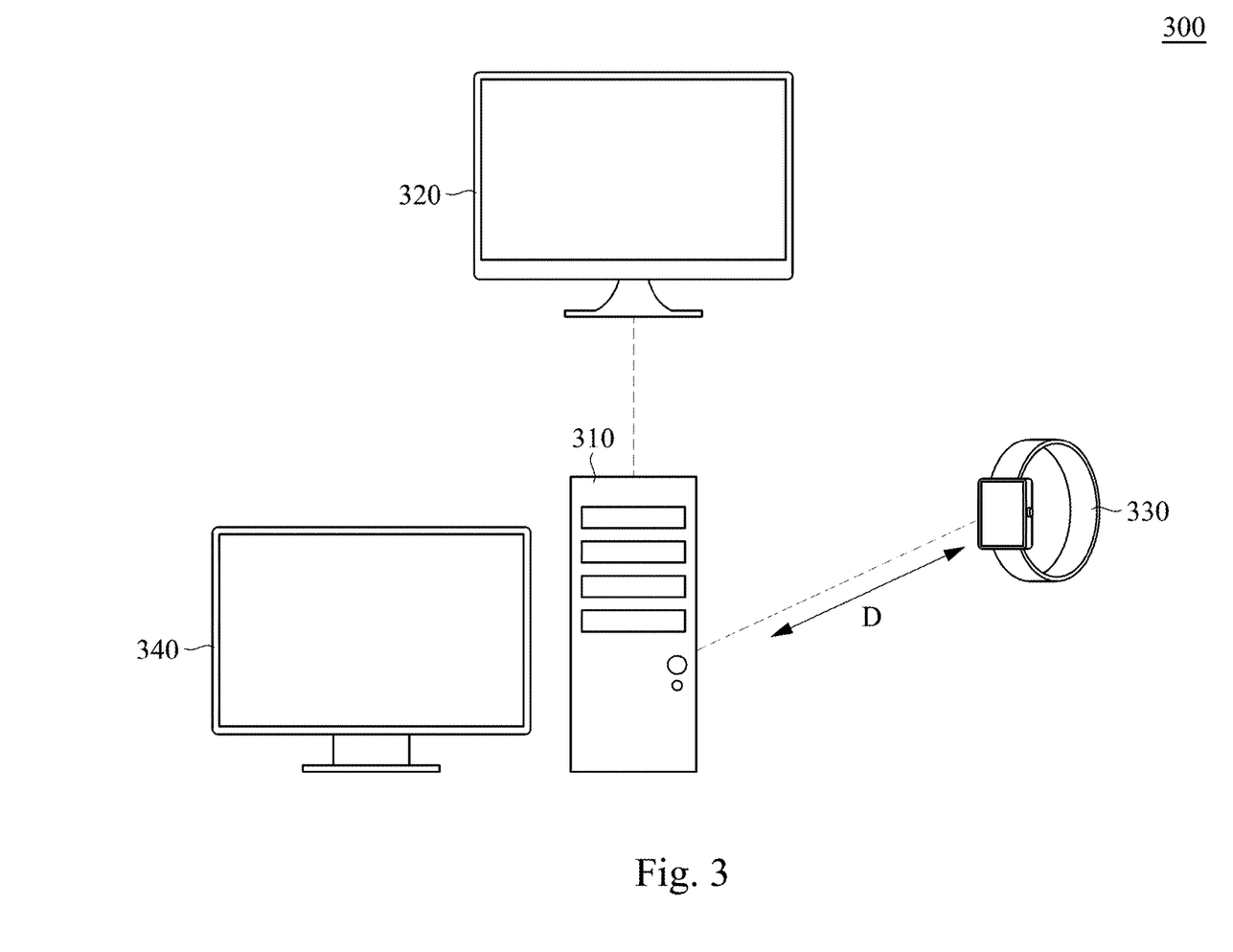
FIG. 3 is a schematic diagram of a terminal device and a display system in some other embodiments of the present disclosure.

FIG. 3 is a schematic diagram of a display system 300 in some other embodiments of the present disclosure. In FIG. 3, the similar components associated with the embodiment of FIG. 1B are labeled with the same numerals for ease of understanding. The specific principle of the similar component has been explained in detail in the previous paragraphs, and unless it has a cooperative relationship with the components of FIG. 3, it is not repeated here.

The display system 300 includes a terminal device 310, an external display 320, a portable device 330 and a display panel 340. In this embodiment, the terminal device 310 (e.g., host computer) and the display panel 340 (e.g., display device) are mutually independent devices, and a communication connection is established between the terminal device 310 and the display panel 340 in a wired or wireless manner. The terminal device 310 is also communicatively connected to the external display 320 to display the display screen by the display panel 340 and/or the external display 320.

When the terminal device 310 performs the stream function, the terminal device 310 is configured to capture at least one part of the display screen, and the at least one part of the display screen will be transmitted to the external display 320. As in the aforementioned embodiments, images presented by the display panel 340 and the external display 320 may be synchronized with each other (i.e., screen projection), or may be an extension of each other (i.e., screen expansion). In addition, when the terminal device 310 receives the wake-up signal, the terminal device 310 can perform the control method shown in FIG. 2 to perform/call the disable function. When the distance between the portable device 330 and the terminal device 310 is less than the set value, the screen lock state of the terminal device 310 is released.

Figure 4:
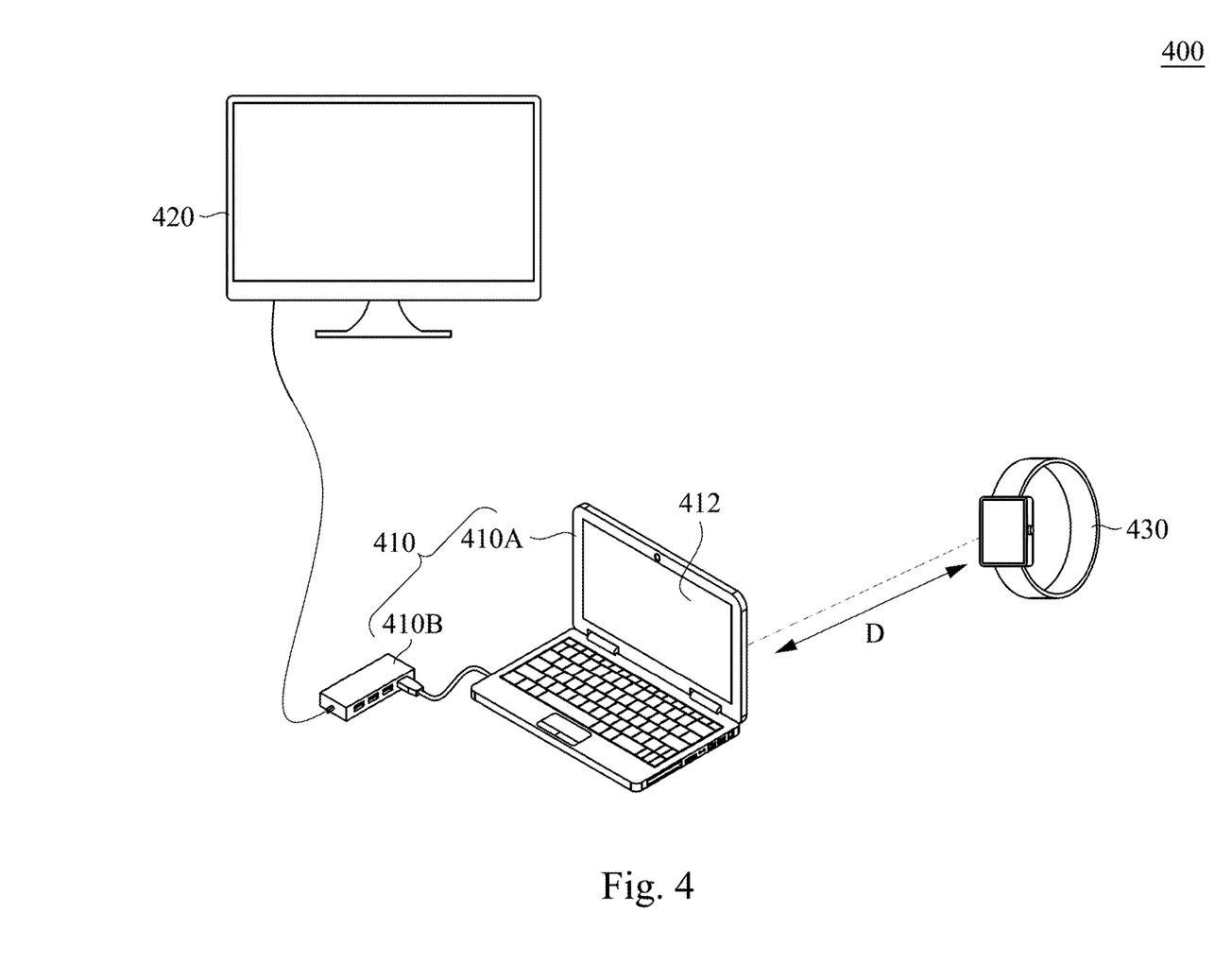
FIG. 4 is a schematic diagram of a terminal device and a display system in some other embodiments of the present disclosure.

FIG. 4 is a schematic diagram of a display system 400 in some other embodiments of the present disclosure. In FIG. 4, the similar components associated with the embodiment of FIG. 1B are labeled with the same numerals for ease of understanding. The specific principle of the similar component has been explained in detail in the previous paragraphs, and unless it has a cooperative relationship with the components of FIG. 4, it is not repeated here.

The display system 400 includes a terminal device 410, an external display 420 and a portable device 430. In this embodiment, the terminal device 410 includes a host 410A and a expansion station 410B. The host 410A and the expansion station 410B are coupled through a signal line (e.g., USB). The expansion station 410B is further connected to the external display 420 through wired or wireless communication, so as to display the display screen by the display panel 412 of the terminal device 410 and/or the external display 420. The terminal device 410 can also perform the control method shown in FIG. 2 to perform/call the disable function. When the distance between the portable device 430 and the terminal device 410 is less than the set value, the screen lock state of the terminal device 410 is released.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:
1. A terminal device control method, comprising:
performing, by a processor of a terminal device, a stream function to capture at least one part of a display screen of the terminal device, wherein the at least one part of the display screen is transmitted to an external display;

when receiving a wake-up signal, turning on a display panel of the terminal device to display the display screen by the processor, and performing a disable function to temporarily interrupt the stream function during a disable period of the disable function by the processor, so that the processor stops capturing the at least one part of the display screen; and after the disable period, resuming to perform the stream function to resume transmitting the at least one part of the display screen to the external display.

2. The terminal device control method of claim 1, wherein the external display maintains a projection program during the disable period, and the projection program is configured to call the stream function to display a virtual screen on the external display.

3. The terminal device control method of claim 2, wherein resuming to perform the stream function comprises:

performing a callback function of the stream function to generate an update area data and a description data, wherein the update area data is configured to record an area or a position where the virtual screen needs to be updated, and the description data is configured to record an update data of the area or the position.

4. The terminal device control method of claim 1, further comprising:

when the processor determines that one or more preset conditions occur during the disable period, releasing a screen lock state of the terminal device, wherein the one or more preset conditions comprises:

a distance between the terminal device and a portable device is less than a set value.

5. The terminal device control method of claim 4, wherein the portable device is a wearable device, the portable device is configured to generate a touch signal and/or a physiological signal, and is configured to determine whether the portable device is in a wearing state according to the touch signal and/or the physiological signal;

wherein the one or more preset conditions further comprises: the portable device is in the wearing state.

6. The terminal device control method of claim 4, wherein the one or more preset conditions further comprises:

the terminal device and the portable device are logged into a same account.

7. A terminal device, comprising:

a communication circuit communicatively connected to an external display;

a display panel; and a processor coupled to the communication circuit and the display panel, configured to perform a stream function to capture at least one part of a display screen of the terminal device, wherein the at least one part of the display screen is transmitted to the external display;

wherein when the processor receives a wake-up signal, the processor turns on the display panel to display the display screen, and performs a disable function to temporarily interrupt the stream function during a disable period of the disable function, so that the processor stops capturing the at least one part of the display screen; and wherein after the disable period, the processor resumes to perform the stream function to resume transmitting the at least one part of the display screen to the external display.

8. The terminal device of claim 7, wherein the external display maintains a projection program during the disable period, and the projection program is configured to call the stream function to display a virtual screen on the external display.

9. The terminal device of claim 8, wherein the processor is configured to perform a callback function of the stream function to generate an update area data and a description data, the update area data is configured to record an area or a position where the virtual screen needs to be updated, and the description data is configured to record an update data of the area or the position.

10. The terminal device of claim 7, wherein when the processor determines that one or more preset conditions occur during the disable period, the processor releases a screen lock state of the terminal device; and wherein the one or more preset conditions comprises: a distance between the terminal device and a portable device is less than a set value.

11. The terminal device of claim 10, wherein the portable device is a wearable device, the portable device is configured to generate a touch signal and/or a physiological signal, and is configured to determine whether the portable device is in a wearing state according to the touch signal and/or the physiological signal;

wherein the one or more preset conditions further comprises: the portable device is in the wearing state.

12. The terminal device of claim 10, wherein the one or more preset conditions further comprises:

the terminal device and the portable device are logged into a same account.

13. A display system, comprising:

a display panel; and a terminal device communicatively connected to the display panel and an external display to display a display screen by the display panel and/or the external display, wherein when the terminal device performs a stream function, the terminal device is configured to capture at least one part of the display screen of the terminal device, and the at least one part of the display screen is transmitted to the external display;

wherein when the terminal device receives a wake-up signal, the terminal device drives the display panel to display the display screen, and performs a disable function to temporarily interrupt the stream function during a disable period of the disable function, so that the terminal device stops capturing the display screen; and wherein after the disable period, the terminal device resumes to perform the stream function to resume transmitting the at least one part of the display screen to the external display.

14. The display system of claim 13, wherein the external display maintains a projection program during the disable period, and the projection program is configured to call the stream function to display a virtual screen on the external display.

15. The display system of claim 14, wherein the terminal device is configured to perform a callback function of the stream function to generate an update area data and a description data, the update area data is configured to record an area or a position where the virtual screen needs to be updated, and the description data is configured to record an update data of the area or the position.

16. The display system of claim 13, wherein when the terminal device determines that one or more preset conditions occur during the disable period, the terminal device releases a screen lock state of the terminal device; and wherein the one or more preset conditions comprises: a distance between the terminal device and a portable device is less than a set value.

17. The display system of claim 16, wherein the portable device is a wearable device, the portable device is configured to generate a touch signal and/or a physiological signal, and is configured to determine whether the portable device is in a wearing state according to the touch signal and/or the physiological signal;

wherein the one or more preset conditions further comprises: the portable device is in the wearing state.

* * * * *